US009246359B2

United States Patent
Moon et al.

(10) Patent No.: US 9,246,359 B2
(45) Date of Patent: Jan. 26, 2016

(54) APPARATUS FOR HARVESTING LEAKAGE ENERGY (71) Applicant: ELECTRONICS AND TELECOMMUNICATIONS RESEARCH INSTITUTE, Daejeon (KR)

(72) Inventors: Jung Ick Moon, Daejeon (KR); In Kui Cho, Daejeon (KR); Seong-Min Kim, Daejeon (KR); Je Hoon Yun, Daejeon (KR); Woo Jin Byun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 288 days.

(21) Appl. No.: 13/773,873

(22) Filed: Feb. 22, 2013

(65) Prior Publication Data
US 2013/0229064 A1 Sep. 5, 2013

(30) Foreign Application Priority Data

Feb. 27, 2012 (KR) .................. 10-2012-0019957

(51) Int. Cl.
H01F 27/42 (2006.01)
H01F 37/00 (2006.01)
H01F 38/00 (2006.01)
H02J 17/00 (2006.01)
H04B 5/00 (2006.01)
H02J 5/00 (2006.01)
H02J 7/02 (2006.01)

(52) U.S. Cl.
CPC ............ H02J 17/00 (2013.01); H02J 5/005 (2013.01); H02J 7/025 (2013.01); H04B 5/0037 (2013.01); H04B 5/0087 (2013.01)

(58) Field of Classification Search
CPC ............ H04B 1/10; H04B 1/16; H04B 1/38; H04B 5/0037; H04B 5/00; H04M 1/00; H05H 1/24; C23C 14/34; C23C 16/00; H02J 5/005; H02J 7/025; H02J 17/00
USPC .................. 455/343.1, 299, 572; 216/67; 204/298.08, 192.1; 118/723; 427/569; 156/345.48; 307/104
See application file for complete search history.

(56) References Cited

U.S. PATENT DOCUMENTS 7,276,897 B2 * 10/2007 Lee ...................... 324/207.17
8,022,576 B2   9/2011 Joannopoulos et al.
2007/0298846 A1 * 12/2007 Greene et al. ............. 455/572

FOREIGN PATENT DOCUMENTS

KR  1020110117732 A  10/2011
WO  2008/118178 A1  10/2008

OTHER PUBLICATIONS

Zhi Sun, et al; "MISE-PIPE: Magnetic induction-based wireless sensor networks for underground pipeline monitoring", Ad Hoc Networks, vol. 9, pp. 218-227; Available online Oct. 20, 2010.

Primary Examiner — Carlos Amaya
(74) Attorney, Agent, or Firm — Ladas & Parry LLP (57) ABSTRACT Disclosed is an apparatus for harvesting leakage energy. The apparatus for harvesting leakage energy includes: an energy harvesting unit configured to harvest energy leaked while energy radiated from a transmitting unit of an energy transmitting apparatus is transmitted to a receiving unit of an energy receiving apparatus; and a harvesting circuit module configured to supply energy harvested by the energy harvesting unit to a load. In accordance with the embodiment of the present invention, energy efficiency of overall system can be increased by harvesting the leakage energy without affecting performance of a wireless power transmission system.

6 Claims, 8 Drawing Sheets

APPARATUS FOR HARVESTING LEAKAGE ENERGY

CROSS-REFERENCES TO RELATED APPLICATIONS

The present application claims priority under 35 U.S.C 119(a) to Korean Application No. 10-2012-0019957, filed on Feb. 27, 2012, in the Korean Intellectual Property Office, which is incorporated herein by reference in its entirety set forth in full.

BACKGROUND

Exemplary embodiments of the present invention relate to an apparatus for harvesting leakage energy, and more particularly, to an apparatus for harvesting leakage energy in a wireless power transmission system using a magnetic resonance or electromagnetic induction phenomenon.

Generally, devices driven using electricity as an energy source are supplied with power through a power line. However, there are problems in that a use of the power line hinders mobility of the devices or has a limitation in a position.

Recently, with a rapid use of a mobile device in addition to smart phones, a demand for wireless charging technologies has been increased. Therefore, research into a wireless power transmission system capable of transferring power wirelessly has been actively conducted.

Technologies of transmitting power wirelessly convert electric energy into an electromagnetic wave or a light wave that can be transmitted wirelessly and transmit power using electric field, magnetic field, or electromagnetic field and may be largely classified into an electromagnetic induction type, a magnetic resonance type, a microwave type, and the like.

The electromagnetic induction type is a type of generating induction current at two coils and transmitting energy, the magnetic resonance type is a type of using an evanescent wave coupling phenomenon of moving an electromagnetic wave from one medium to another medium through near field when two media are resonated at the same frequency, and the microwave type is a type of transmitting energy by radiating a microwave signal to the air through an antenna.

A physical quantity leaked while the physical quantity radiated from a resonator or a radiator is transmitted to a receiver by passing through a space is essentially present in the wireless power transmission system.

The energy leaked to the space acts as loss in the wireless power transmission system, thereby degrading overall transmission efficiency and energy efficiency.

As the related art, KR Patent Laid-Open No. 2011-0117732 (Oct. 27, 2011: Wireless Energy Transmission)

The above-mentioned technical configuration is a background art for helping understanding of the present invention and does not mean related arts well known in a technical field to which the present invention pertains.

SUMMARY

An embodiment of the present invention is directed to an apparatus for harvesting leakage energy capable of increasing energy efficiency by harvesting leakage energy without affecting a wireless power transmission system.

An embodiment of the present invention relates to an apparatus for harvesting leakage energy, including: an energy harvesting unit configured to harvest energy leaked while energy radiated from a transmitting unit of an energy transmitting apparatus is transmitted to a receiving unit of an energy receiving apparatus; and a harvesting circuit module configured to supply energy harvested by the energy harvesting unit to a load.

The energy harvesting unit may include: an inner loop coil configured to be disposed at an outer side of the transmitting unit or the receiving unit and having an opened side; and an outer loop coil configured to be disposed at an outer side of the inner loop coil and having an opened side, wherein the opened sides of the inner loop coil and the outer loop coil are connected to each other to form a single closed loop.

The energy harvesting unit may be disposed at the transmitting unit.

The energy harvesting unit may be disposed at a predetermined distance from the transmitting unit or the receiving unit.

The transmitting unit and the receiving unit may each be a transmitting coil and a receiving coil.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, an apparatus for harvesting leakage energy in accordance with embodiments of the present invention will be described with reference to the accompanying drawings.

During the process, a thickness of lines, a size of components, or the like, illustrated in the drawings may be exaggeratedly illustrated for clearness and convenience of explanation. Further, the following terminologies are defined in consideration of the functions in the present invention and may be construed in different ways by intention or practice of users and operators. Therefore, the definitions of terms used in the present description should be construed based on the contents throughout the specification.

Figure 1:
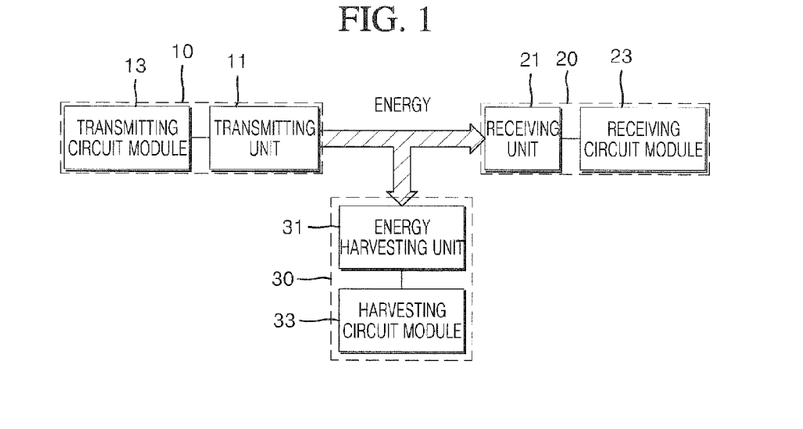
FIG. 1 is a block diagram of a wireless power transmission system including an apparatus for harvesting leakage energy in accordance with an embodiment of the present invention.
Figure 2:
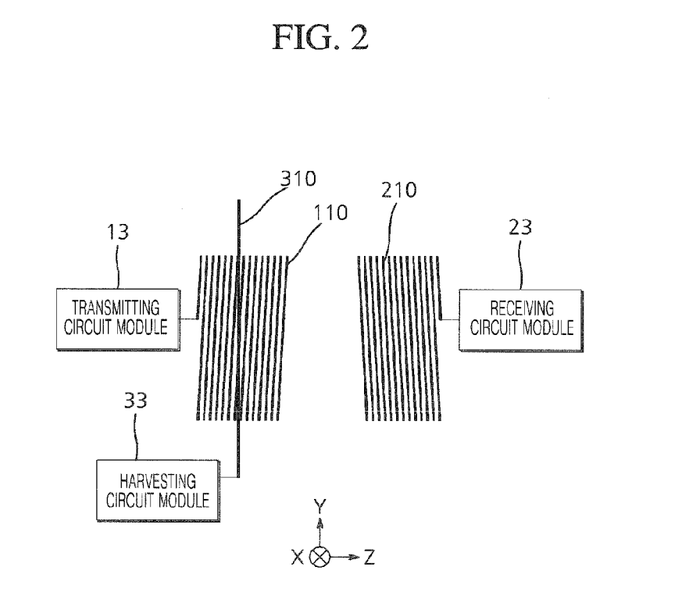
FIG. 2 is a side view for describing an apparatus for harvesting leakage energy in accordance with an embodiment of the present invention.

FIG. 1 is a block diagram of a wireless power transmission system including an apparatus for harvesting leakage energy in accordance with an embodiment of the present invention and FIG. 2 is a side view for describing an apparatus for harvesting leakage energy in accordance with an embodiment of the present invention.

Figure 3:
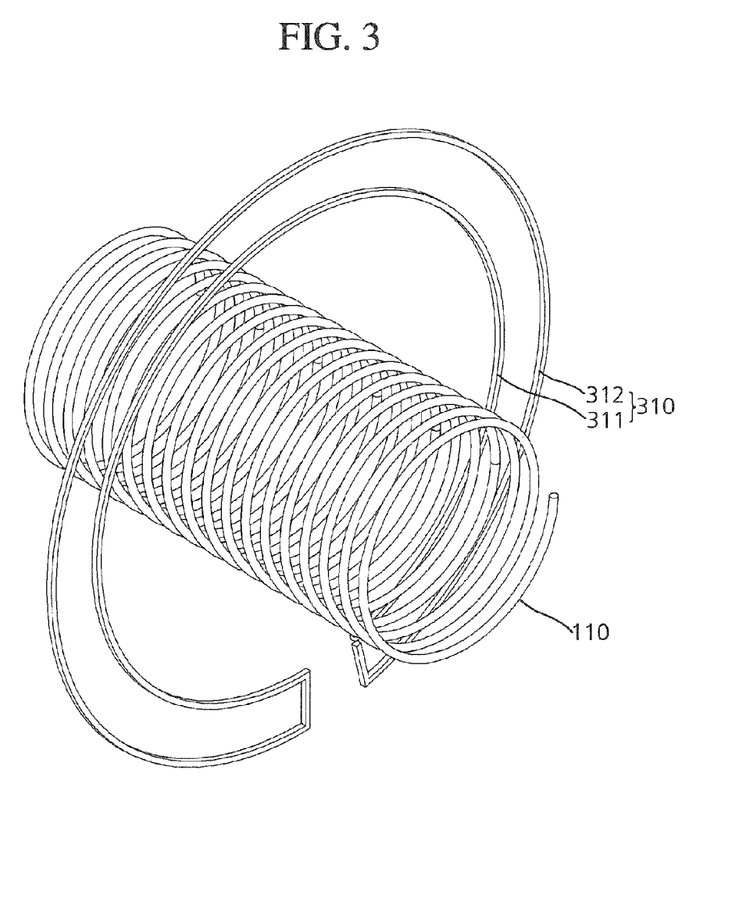
FIG. 3 is a perspective view for describing an apparatus for harvesting leakage energy in accordance with an embodiment of the present invention.
Figure 4:
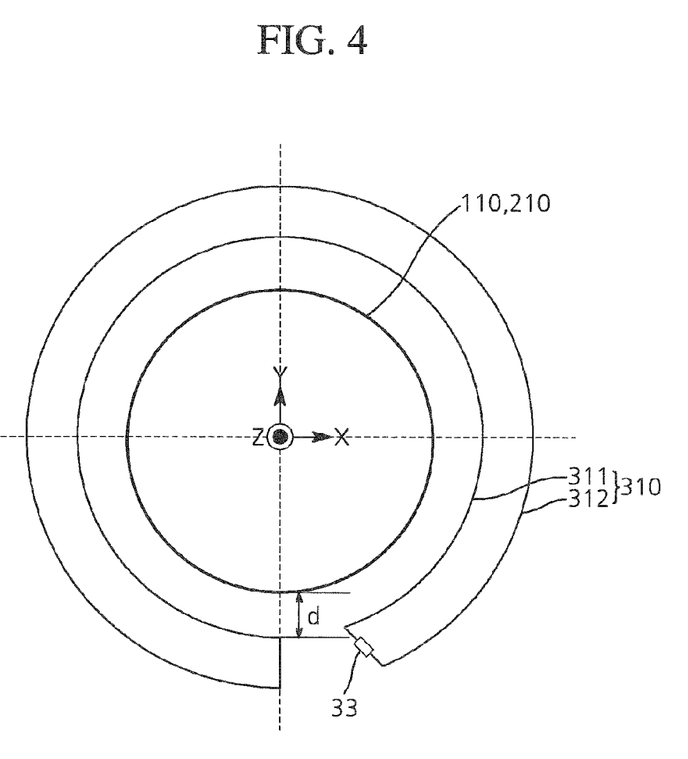
FIG. 4 is a front view for describing an apparatus for harvesting leakage energy in accordance with an embodiment of the present invention.

In addition, FIG. 3 is a perspective view for describing an apparatus for harvesting leakage energy in accordance with an embodiment of the present invention and FIG. 4 is a front view for describing an apparatus for harvesting leakage energy in accordance with an embodiment of the present invention.

As illustrated in FIG. 1, a wireless power transmission system in accordance with an embodiment of the present invention includes an energy transmitting apparatus 10, an energy receiving apparatus 20, and an apparatus for harvesting leakage energy 30.

The energy transmitting unit 10 includes a transmitting circuit module 13 generates an RF signal to be transmitted and amplifies and outputs the generated RF signal and a transmitting unit 11 that receives the RF signal from the transmitting circuit module 13 to radiate energy to the energy receiving apparatus 20.

The energy receiving apparatus 20 includes a receiving unit 21 that receives energy radiated from the transmitting unit 11 and transmits the received energy to a receiving circuit module 23 and the receiving circuit module 23 that receives energy from the receiver 21 and supplies the received energy to a load.

In this configuration, the transmitting unit 11 and the receiving unit 21 may be a transmitting coil 110 and a receiving coil 210 that may each transmit or receive energy by electromagnetic induction and a resonator (not illustrated) that may transmit or receive energy using a magnetic resonance type.

Meanwhile, as illustrated in FIG. 1, the apparatus for harvesting leakage energy 30 in accordance with the embodiment of the present invention harvest energy leaked during the transmission of the energy radiated from the energy transmitting apparatus 10 to the energy receiving apparatus 20 and includes an energy harvesting unit 31 and a harvesting circuit module 33.

The energy harvesting unit 31 may be disposed at a predetermined distance from an outer side of the transmitting unit 11 to harvest energy leaked from the transmitting unit 11.

In this case, the energy harvesting unit 31 may be disposed at a predetermined distance from an outer side of the receiving unit 31 rather than the transmitting unit 11 to harvest energy leaked from the receiving unit 21 and may be disposed at various positions but may be preferably disposed at the transmitting unit 11 side to which energy is radiated in terms of the energy harvesting efficiency.

As illustrated in FIGS. 2 and 3, the energy harvesting unit 31 may be a harvesting coil 310 in a loop form that harvests the energy leaked from the transmitting coil 110 or the receiving coil 210 and as illustrated in FIG. 4, the harvesting coil 310 may be configured to include an inner loop coil 311 and an outer loop coil 312.

In this configuration, the harvesting coil 310 including the inner loop coil 311 and the outer loop coil 312 may be configured of a conductor in which current may flow.

Referring to FIG. 4, the inner loop coil 311 may be formed to have a diameter larger by a predetermined distance d than the transmitting coil 110 or the receiving coil 210 and the outer loop coil 312 may be formed to have a diameter larger than the inner loop coil 311.

That is, the inner loop coil 311 and the outer loop coil 312 are spaced apart from the transmitting coil 110 or the receiving coil 210 by the predetermined distance d and thus, may be disposed in a concentric shape.

As illustrated in FIG. 4, the inner loop coil 311 and the outer loop coil 312 each have opened sides and the opened sides of the inner loop coil 311 and the outer loop coil 312 may be connected to each other to form a single closed loop and the detailed description thereof will be described below.

The harvesting circuit module 33 receives the energy harvested in the energy harvesting unit 31 and supplies the received energy to loads such as elements, devices, and the like.

Since the amount of energy harvested in the energy harvesting unit 31 is small, the harvesting circuit module 33 preferably supplies energy to elements or devices having low power consumption, such as a light emitting diode (LED) lamp, and the like. By this operation, the energy efficiency of the overall system can be increased.

Figure 5:
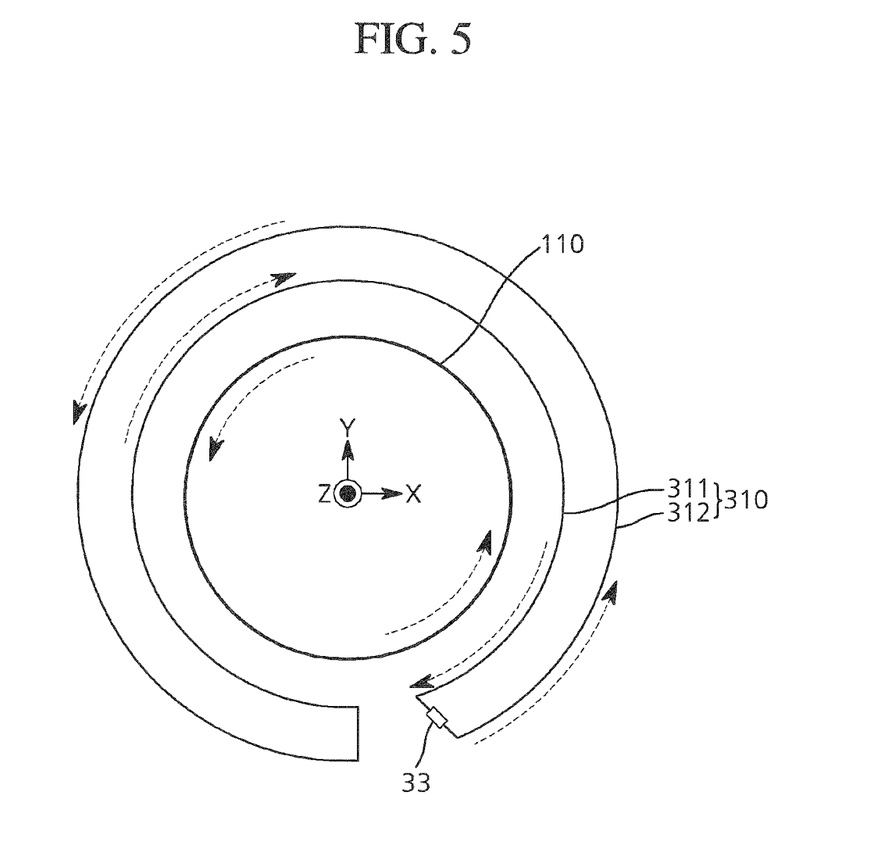
FIG. 5 is a diagram for describing an energy harvesting principle of an apparatus for harvesting leakage energy in accordance with an embodiment of the present invention.
Figure 6:
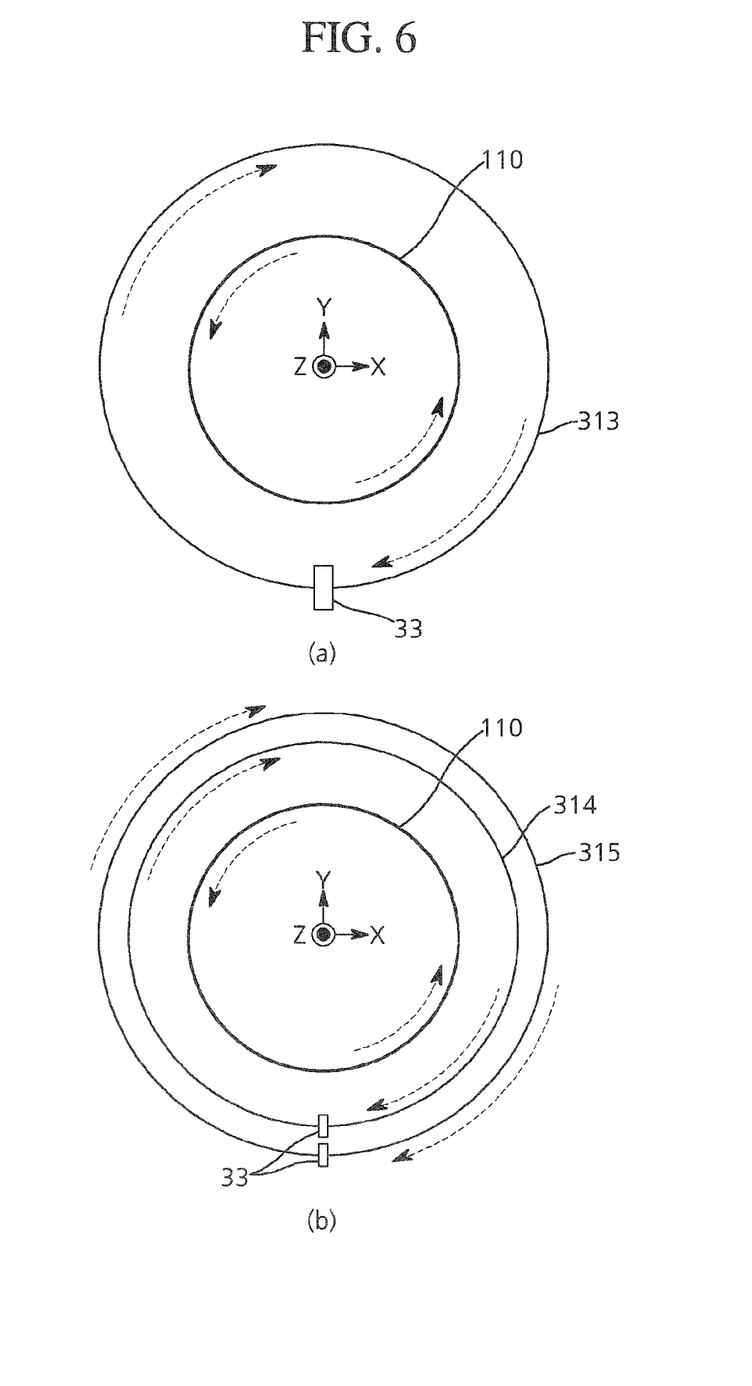
FIGS. 6A and 6B are diagrams for describing an effect of an apparatus for harvesting leakage energy in accordance with an embodiment of the present invention.

FIG. 5 is a diagram for describing an energy harvesting principle of an apparatus for harvesting leakage energy in accordance with an embodiment of the present invention and FIG. 6 is a diagram for describing an effect of an apparatus for harvesting leakage energy in accordance with an embodiment of the present invention.

Meanwhile, as described above, the inner loop coil 311 and the outer loop coil 312 configuring the harvesting coil 310 may each have the opened sides. As illustrated in FIG. 4, each opened side of the inner loop coil 311 and the outer loop coil 312 may be connected to each other to form the single closed loop.

In this case, the energy harvesting quantity may be in proportion to an area of a closed curved surface formed by the inner loop coil 311 and the outer loop coil 312 to harvest energy as desired by appropriately adjusting the diameter of the inner loop coil 311 and the outer loop coil 312.

As described above, the opened sides of the inner loop coil 311 and the outer loop coil 312 are connected to each other to form the single closed loop, which can harvest leakage energy without affecting the wireless power transmission system including the energy transmitting apparatus 10 and the energy receiving apparatus 20.

FIG. 5 illustrates a direction of current flowing in each coil when the opened sides of the inner loop coil 311 and the outer loop coil 312 are connected to each other to form the single closed loop.

Referring to FIG. 5, provided that current flows in the transmitting coil 110 counterclockwise, current flows in the inner loop coil 311 clockwise that is a direction opposite to the transmitting coil 110 according to a Len's law.

In this case, the inner loop coil 311 and the outer loop coil 312 are connected to each other in the single closed loop and therefore, current flows in the outer loop coil 312 counterclockwise that is a direction opposite to the inner loop coil 311.

The current flowing in a direction opposite to the transmitting coil 110 prevents power from being smoothly transmitted from the transmitting coil 110. However, in the present invention, current flows in the outer loop coil 312 in the same direction as the transmitting coil 110 and therefore, the influence due to the inner loop coil 311 may be offset, which little affect the power transmission of the transmitting coil 110.

FIG. 6 illustrates a direction of current flowing in each coil when harvesting energy using a single loop coil 313 and harvesting energy using two loop coils 314 and 315 that are not connected to each other.

As illustrated in FIG. 6A, when using the single loop coil 313, current flows in the single loop coil 313 in a direction opposite to current flowing in the transmitting coil 110 to prevent the power transmission of the transmitting coil 100.

In addition, as illustrated in FIG. 6B, when using two loop coils 314 and 315 that are not connected to each other, the influence of energy generated from the transmitting coil 110 is dominated and therefore, current flows in both of the two loop coils 314 and 315 that are not connected to each other in a direction opposite to the transmitting coil 110 to prevent the power transmission of the transmitting coil 110.

As described above, according to the apparatus for harvesting leakage energy 30 of the present invention, the opened sides of the inner loop coil 311 and the outer loop coil 312 are connected to each other to form the single closed loop, which can harvest the leakage energy without affecting the power transmission of the transmission coil 110. As a result, the energy efficiency can be increased.

The effect of the present invention will be described in more detail with reference to FIGS. 7 to 10.

Figure 7:
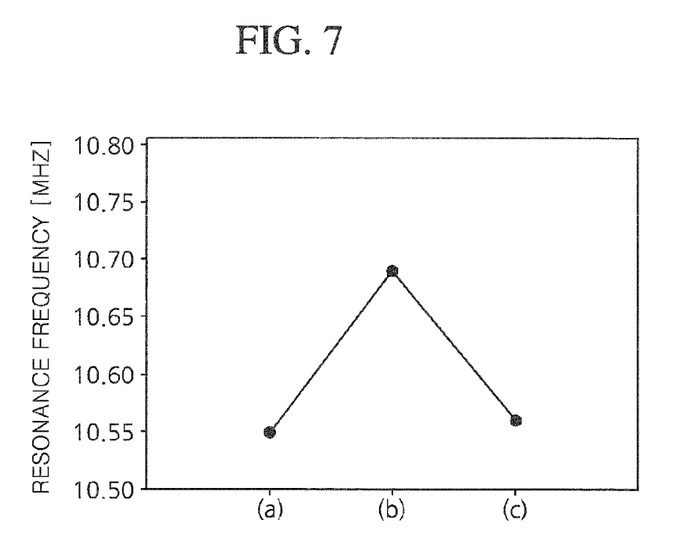
FIG. 7 is a graph for describing a change in a resonance frequency of a wireless power transmission system when using an apparatus for harvesting leakage energy in accordance with an embodiment of the present invention.
Figure 8:
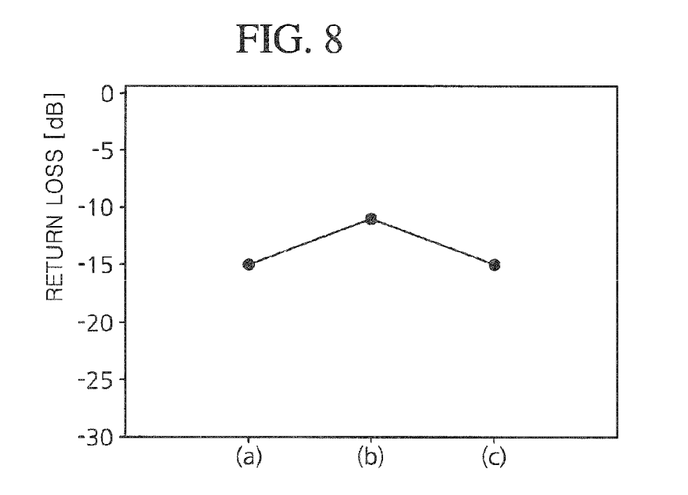
FIG. 8 is a graph for describing a change in a return loss of a wireless power transmission system when using an apparatus for harvesting leakage energy in accordance with an embodiment of the present invention.

FIG. 7 is a graph for describing a change in a resonance frequency of a wireless power transmission system when using an apparatus for harvesting leakage energy in accordance with an embodiment of the present invention and FIG. 8 is a graph for describing a change in a return loss of a wireless power transmission system when using an apparatus for harvesting leakage energy in accordance with an embodiment of the present invention.

Figure 9:
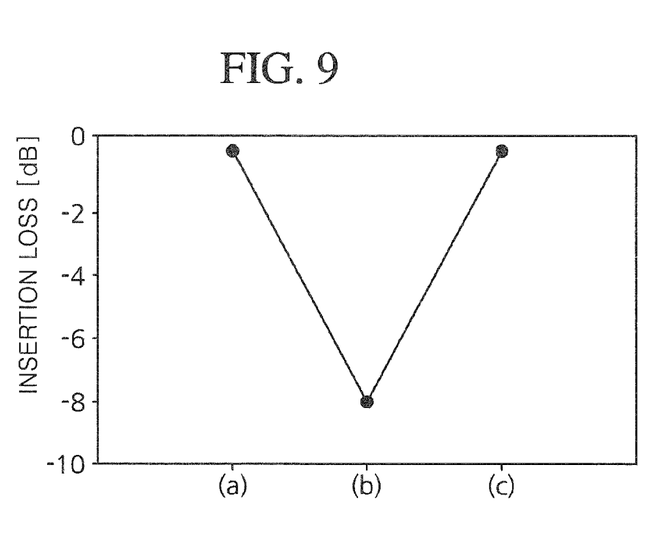
FIG. 9 is a graph for describing a change in an insertion loss of a wireless power transmission system when using an apparatus for harvesting leakage energy in accordance with an embodiment of the present invention.
Figure 10:
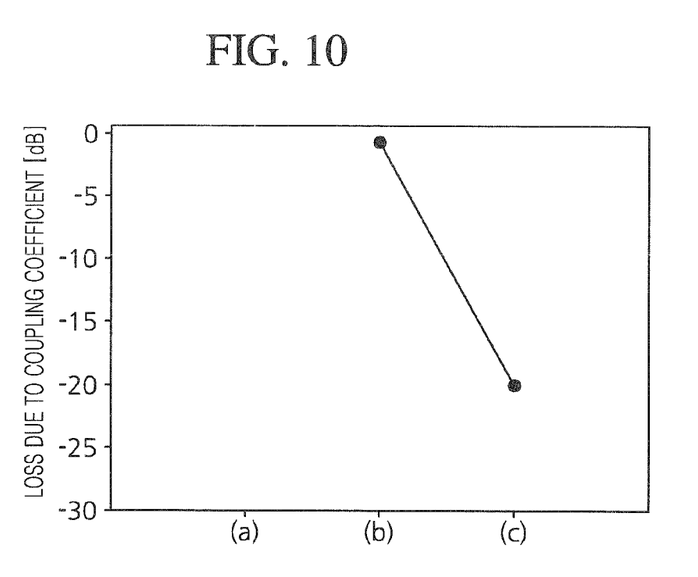
FIG. 10 is a graph for describing a change in loss according to a coupling coefficient between an energy transmitting unit and an energy harvesting unit in a wireless power transmission system when using an apparatus for harvesting leakage energy in accordance with an embodiment of the present invention.

FIG. 9 is a graph for describing a change in an insertion loss of a wireless power transmission system when using an apparatus for harvesting leakage energy in accordance with an embodiment of the present invention and FIG. 10 is a graph for describing a change in loss according to a coupling coefficient between an energy transmitting unit and an energy harvesting unit in a wireless power transmission system when using an apparatus for harvesting leakage energy in accordance with an embodiment of the present invention.

FIGS. 7 to 10 commonly illustrate calculated simulation values in three cases.

In each figure of FIGS. 7 to 10, (a) illustrates the case in which there is no apparatus for harvesting leakage energy 30, (b) illustrates the case in which the single loop coil 313 is used as illustrated in FIG. 6A, and (c) illustrates the case in which the apparatus for harvesting leakage energy 30 in accordance with the present invention is used.

Simulation execution conditions are illustrated in the following Table 1.

TABLE 1

| Common Condition | Transmitting Coil (110) | Diameter 60 cm, 5.5 turns |
|---|---|---|
| | Receiving Coil (210) | Diameter 60 cm, 5.5 turns |
| | Distance Between Transmitting Coil (110) and Receiving Coil (210) | 90 cm (Center-Center) |
| (b) | Harvesting Coil (310) | Diameter 129 cm, 1 turn |
| | Distance Between Transmitting Coil (110) and Harvesting Coil (310) | 34.5 cm (Outermost-Outermost, Based On Vertical Axis) |

TABLE 1-continued

| (c) | Harvesting Coil (310) | Inner Diameter 109 cm, Outer Diameter 129 cm 1 turn |
|---|---|---|
| | Distance Between Transmitting Coil (110) and Harvesting Coil (310) | 24.5 cm (Outermost-Outermost, Based On Vertical Axis) |

Referring to FIG. 7, in the case of (b) using the single loop coil 313, the resonance is generated at 10.70 [MHz] and thus, the resonance frequency is larger changed than (a) in which the resonance is generated at 10.55 [MHz]. However, in the case of (c) in accordance with the embodiment of the present invention, it can be appreciated that there is little difference from (a) in terms of the resonance frequency.

Similarly, referring to FIGS. 8 and 9, in the case of (c) in accordance with the embodiment of the present invention unlike (b) using the single loop coil, it can be appreciated that there is little difference from (a) in terms of the return loss and the insertion loss.

In addition, FIG. 10 illustrates the loss due to the coupling coefficient between the transmitting coil 110 and the harvesting coil 310. As the loss approximates '0', the coupling coefficient between the transmitting coil 110 and the harvesting coil 310 is increased and thus, more energy is transmitted to the harvesting coil 310 than the receiving coil 210 to be originally transmitted.

However, as illustrated in FIG. 10, in the (c) of the embodiment of the present invention, the loss due to the coupling coefficient is about −20 [dB], which corresponds to a value of about 1/100. Therefore, it can be appreciated that the power transmission of the transmitting coil 110 is little affected.

When the power transmittal is maximal, in the case of (b) using the single loop coil 313, strong coupling is generated between magnetic field and the loop coil and as a result, the magnetic distribution near the transmitting coil 110 is distorted and energy is not originally transmitted to the receiving coil 210.

On the other hand, in the case of (c) in accordance with the embodiment of the present invention, the approximately same magnetic distribution as (a) that does not have the apparatus for harvesting leakage energy 30 is maintained as it is and as a result, the apparatus for harvesting leakage energy 30 in accordance with the embodiment of the present invention little affects the wireless transmission system.

As described above, according to the apparatus for harvesting leakage energy 30 of the present invention, the energy leaked while the energy radiated from the energy transmitting apparatus 10 of the wireless power transmission system is transmitted to the energy receiving apparatus 20 can be harvested through the harvesting coil 310 in a loop form.

In addition, the present invention forms the single closed loop by connecting the inner loop coil 311 included in the apparatus for harvesting leakage energy 30 with the opened side of the outer loop coil 312, thereby harvesting the leakage energy without affecting the performance of the wireless power transmission system.

In addition, in accordance with the embodiments of the present invention, it is possible to increase the energy efficiency of the overall system by driving the elements or the devices having the low power consumption using the harvested energy.

Meanwhile, in the embodiment of the present invention, the case in which the harvesting coil 310 harvesting energy is disposed at the transmitting coil 110 side is mainly described, but the position at which the harvesting coil 310 is disposed is not limited thereto and therefore, the harvesting coil 310 can be disposed at the receiving coil 210 side.

In accordance with the embodiments of the present invention, it is possible to harvest energy leaked while the energy radiated from the energy transmission apparatus of the wireless power transmission system is transmitted to the energy receiving apparatus through the harvesting coil in the loop form.

Further, in accordance with the embodiments of the present invention, it is possible to harvest the leakage energy without affecting the performance of the wireless power transmission system by forming the single closed loop by connecting the inner loop coil included in the apparatus for harvesting leakage energy with the opened side of the outer loop coil.

In addition, in accordance with the embodiments of the present invention, it is possible to increase the energy efficiency of the overall system by driving the elements or the devices having the low power consumption using the harvested energy.

Although the embodiments of the present invention have been described in detail, they are only examples. It will be appreciated by those skilled in the art that various modifications and equivalent other embodiments are possible from the present invention. Accordingly, the actual technical protection scope of the present invention must be determined by the spirit of the appended claims.

What is claimed is:

1. An apparatus for harvesting leakage energy, comprising:
    an energy harvesting unit disposed on an outer side of a transmitting unit of an enemy transmitting apparatus, which is configured to radiate energy to be transmitted to an energy receiving apparatus, and configured to harvest leaked energy, which is a portion of the energy radiated from the transmitting unit that is not transmitted to a receiving unit of the energy receiving apparatus; and
    a harvesting circuit module configured to supply energy harvested by the energy harvesting unit to a load.

2. The apparatus of claim 1, wherein the energy harvesting unit includes:
    an inner loop coil configured to be disposed at an outer side of the transmitting unit or the receiving unit and to have an opened side; and
    an outer loop coil configured to be disposed at an outer side of the inner loop coil and to have an opened side,
    the opened sides of the inner loop coil and the outer loop coil being connected to each other to form a single closed loop.

3. The apparatus of claim 1, wherein the energy harvesting unit is disposed on the transmitting unit.

4. The apparatus of claim 1, wherein the energy harvesting unit is disposed at a predetermined distance from the transmitting unit or the receiving unit.

5. The apparatus of claim 1, wherein the transmitting unit and the receiving unit each are a transmitting coil and a receiving coil.

6. The apparatus of claim 2, wherein diameters of the inner loop coil and the outer loop coil are determined, respectively, based on an amount of energy to be harvested.

* * * * *